Nov. 18, 1941.   C. H. O. WITTIG   2,263,344
NOSEPIECE FOR MICROSCOPES
Filed July 21, 1939

CARL H.O. WITTIG
INVENTOR
BY J.A. Ellestad
   Bird Wiggins
ATTORNEYS

Patented Nov. 18, 1941

2,263,344

UNITED STATES PATENT OFFICE 2,263,344

NOSEPIECE FOR MICROSCOPES

Carl H. O. Wittig, Irondequoit, N. Y., assignor to Bausch & Lomb Optical Company, Rochester, N. Y., a corporation of New York Application July 21, 1939, Serial No. 285,741

2 Claims. (Cl. 88—39)

The present invention relates to microscopes and more particularly to nosepieces for carrying a plurality of objective lenses.

One of the objects of the present invention is to provide a microscope nosepiece which is simple in construction yet rigid, accurate and smooth in operation. Another object is to provide a rotary microscope nosepiece in which any wear in the pivot may be taken up and the operation of the nosepiece kept uniform at all times. Still a further object is to provide a microscope nosepiece with a new and improved latch mechanism for releasably holding a selected objective in operative position. These and other objects and advantages reside in certain novel features of construction, arrangement and combination of parts as will hereinafter be more fully set forth and pointed out in the appended claims.

Referring to the drawing.

Figure 1:
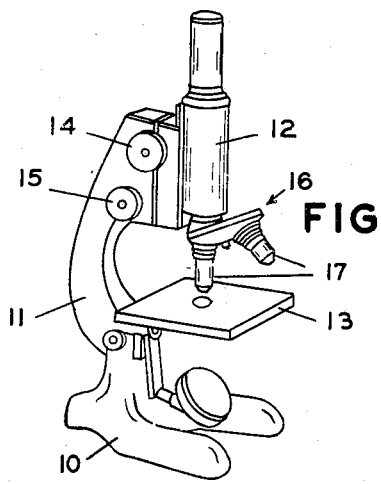
Fig. 1 is a perspective view of a microscope carrying my new nosepiece.
Figure 4:
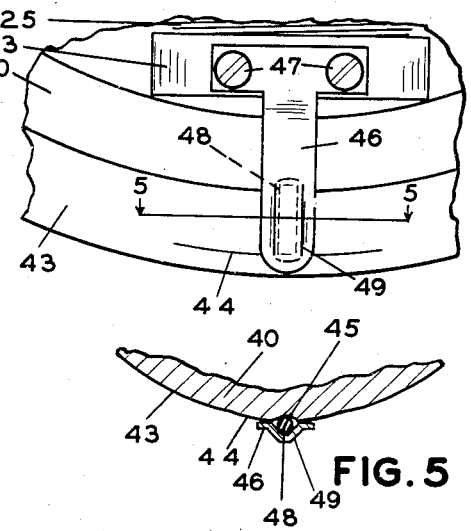
Fig. 4 is a fragmentary side elevation of the latching means.
Figure 5:
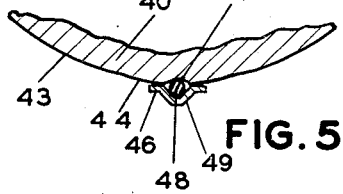
Fig. 5 is a section taken on line 5—5 of Fig. 4.

In the drawing, my new nosepiece is shown in connection with a conventional microscope having a base 10, arm 11, body tube 12 and stage 13. The usual coarse and fine adjustment knobs 14 and 15, respectively, serve to focus the microscope. The nosepiece indicated generally at 16, is secured to the body tube 12 and carries a plurality of objectives 17.

Figure 2:
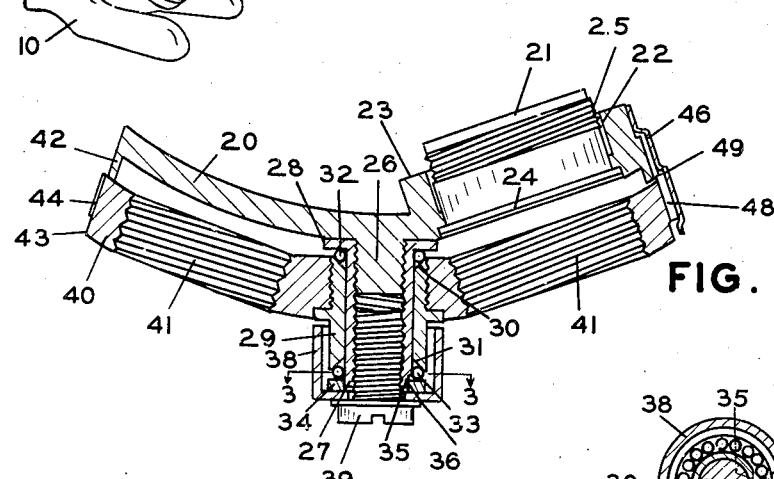
Fig. 2 is a vertical section of a preferred form of my nosepiece.
Figure 3:
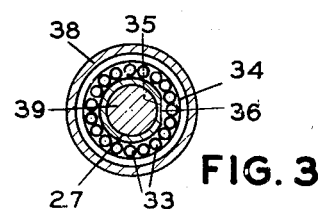
Fig. 3 is a section taken on line 3—3 of Fig. 2.

My new nosepiece consists of a fixed part 20 which is rigidly fastened to the body tube 12 or some other suitable part of the microscope. In the embodiment shown in Fig. 2, the fixed part 20 is fastened to the microscope by an annular sleeve 21 which extends through the aperture 22 of a boss 23 and is held against removal from the part 20 by a flange or shoulder 24. The outer end of the sleeve 21 is threaded at 25 for engagement with a corresponding threaded portion of the microscope. Of course, other forms of fastening means may be used without affecting the operation of my nosepiece.

The fixed part 20 is formed with a central stud 26 on which is threaded a cylindrical pivot sleeve 27. A flange 28 on the sleeve 27 seats against the fixed part 20. A bearing sleeve 29 is rotatably on the pivot 27 and is internally chamfered at each end to provide the inclined bearing surfaces 30 and 31. A plurality of ball bearings 32 surround the pivot 27 and are held against the pivot 27 and flange 28 by the bearing surface 30 of the sleeve 29. A second row of ball bearings 33 encircle the pivot 27 and rests against the bearing surface 31 of the sleeve 29. This second row of ball bearings 33 is held in place by a washer 34 which is preferably fixed against rotation on the pivot sleeve 27 by flattening a portion 35 of the pivot 27 and providing a corresponding flattened portion 36 in the aperture of the washer 34.

The bearings and bearing surfaces are protected from dust and dirt by a cap 38 which bears against the washer 34 and is held in place by a screw or bolt 39. This screw 39 extends through both the dust cap 38 and washer 34 and is threaded into the pivot sleeve 27. Any wear in the bearings or bearing surfaces or any looseness between the sleeve 29 and pivot 27 can be taken up by tightening this screw 39.

Figure 6:
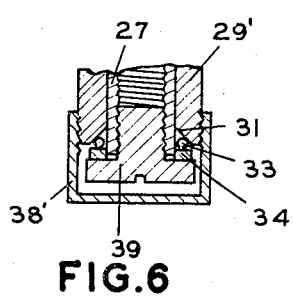
Fig. 6 is an enlarged fragmentary section of a modified form of pivot.

In the event that more complete dust protection is necessary, I have provided the construction shown in Fig. 6. Here the screw 39 engages the washer 34 directly. The sleeve 29' is made thicker and is threaded to receive the dust cap 38'. In this modification, the screw 39, washer 34 and bearings 33 are entirely shielded from dust and dirt.

The bearing sleeve 29 is threaded to receive a rotary objective carrier 40 which is formed with a plurality of threaded holes 41 for holding different objectives 17. These different objectives 17 may be selectively brought into alignment with the attaching sleeve 21 by rotating the carrier 40 and sleeve 29 on the pivot 27. If desired, the fixed part 20 or carrier 42 may be formed with a flange 42 to prevent or reduce the entrance of dust between the fixed part and carrier.

The outer surface 43 of the objective carrier is rounded and is formed with a slight bulge or raised portion 44 adjacent each threaded hole 41. A notch 45 is formed in each portion 44 and these notches 45 bear a fixed predetermined relation to the adjacent objective mounting hole 41. A resilient spring arm 46 is fastened to the boss 23 by screws 47 and projects downward over the surface 43 of the carrier 40. This arm 46 is formed with a recess or pocket 49 in which a roller bearing 48 is loosely mounted. This bearing 48 is in rolling contact with the surface 43 of the carrier 40 and engages in the notches 45 to latch the objectives 17 in proper operative position. The rolling friction of this bearing 48 is not sufficient to injure or destroy any paint or plating on the surface 43. Of course, the surface 43 of the carrier 40 may have a cylindrical contour but I prefer it to have a contour of a frustum of a right cone.

From the foregoing it will be apparent that I have provided a smooth, rigid and accurate microscope nosepiece which can be maintained in its original precise and accurate condition throughout a long period of use. Various modifications can, of course, be made without departing from the spirit of my invention or the scope of the appended claims.

I claim:

1. A microscope nosepiece comprising a fixed part, means for securing said fixed part to a microscope, a second part rotatably mounted on said fixed part and carrying a plurality of objectives any one of which may be moved into operative relation to said fixed part by rotation of said second part, said second part having a rounded exterior surface and a plurality of notches in said surface, one for each objective, a resilient arm secured to said fixed part and extending over the exterior surface of said second part, and a freely rotatable and relatively elongated roller bearing carried by said arm and contacting said surface, said bearing element riding freely over said surface and serving as a detent to engage said notches.

2. A microscope nosepiece in which an objective carrier having a rounded exterior surface is rotatable on a pivot secured to a fixed part of said nosepiece, said objective carrier slidably mounted on said pivot for adjustment towards said fixed part and provided with means for receiving a plurality of objectives adapted to be moved into operative position with said fixed part by rotating the carrier, said rounded surface provided with a plurality of relatively elongated notches, one for each objective, the combination of latch means for securing said objective carrier in any one of its operative positions with respect to said fixed part, said means comprising a resilient arm secured to said fixed part and overhanging said surface of said carrier, said arm having a relatively elongated recess adjacent said surface of said carrier, and a roller bearing of a length substantially equal to said recess positioned therein to be freely rotatable and to contact said surface, said bearing adapted to engage in said notches and releasably hold said carrier against rotation.

CARL H. O. WITTIG.